April 28, 1936.  A. LESTI  2,038,663

AUTOMATIC REVERSE BRAKE

Filed April 26, 1935

INVENTOR
Arnold Lesti

Patented Apr. 28, 1936

2,038,663

UNITED STATES PATENT OFFICE 2,038,663

AUTOMATIC REVERSE BRAKE

Arnold Lesti, Los Angeles, Calif., assignor of one-half to Nathan W. Schireson, Los Angeles, Calif.

Application April 26, 1935, Serial No. 18,403

5 Claims. (Cl. 192—4)

The invention relates to an automatic reverse brake system for vehicles and is particularly adapted to automobiles. In these vehicles this system may be used advantageously in the conventional transmission.

An object of my invention is to automatically prevent vehicles from moving in the reverse direction when they are about to be started moving in the forward direction. Vehicles, particularly automobiles, reverse in this fashion prior to the application of forward driving power and after the release of the conventional brakes when the vehicle is about to be started moving up roads with a grade. This is a source of annoyance and loss of time to the driver. It leads to accidents and requires expert handling of the vehicle to prevent and usually causes undue wear of its parts.

Another object of this invention is to automatically provide sufficient braking power to an automobile just when it stops, after moving up a road with a grade, so that the vehicle will not move in the reverse direction prior to the application of the conventional brakes.

Another object of this invention is to provide sufficient braking power for automobiles so as to assist the conventional emergency brakes; and act as an additional emergency brake if the vehicle has a tendency to move in the reverse direction and the normal brakes are not operating. This feature is useful when traveling in hill or mountain roads.

In this connection, a further detailed object of my invention is to permit reverse motion of the vehicle when the same is hit with great force tending to cause reverse motion. This feature is necessary in order to protect various axles and gears which would otherwise be subjected to breaking strains if the above mentioned features alone were working.

Another object of this invention is to provide a mechanism which is relatively simple, quiet and is not subjected to extreme wear or to the requirement of constant adjustment.

A further object of this invention is to release or render inoperative all of the above mentioned features when the transmission is adjusted to move the vehicle in the reverse direction.

With the foregoing and other objects in view, which will be made manifest in the following detailed description and specifically pointed out in the appended claims, reference is had to the accompanying drawing for an illustrative embodiment of the invention, wherein:

Figure 4:
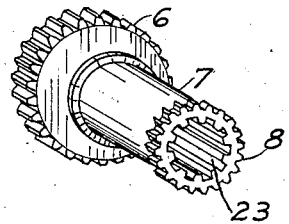
Fig. 4 is a perspective view of the shiftable reverse torque transmitting member.

Referring to the accompanying drawing, wherein similar parts are designated by similar characters throughout, 1 indicates the driving shaft normally connected to the conventional clutch and driven by the gas engine of the vehicle. Character 9 shows the countershaft which rotates integrally low speed gear 3, and driver gear 4 which rotates idler gear 5 shown partly in dotted lines in Fig. 1. The shiftable low and reverse gear 6 is integral with the external clutch gear 8 and both are comprised in a member generally designated 7 and illustrated in perspective in Fig. 4. Member 7 is shiftable on the shaft 24 by the low and reverse speed shifting lever 29, and rotates shaft 24 by the engagement of external splines 25 on internal splines 23. These splines transmit torque from shaft 24 to member 7 and vice versa.

Splines 21 on the driven shaft 22 are connected to the universal joint, not shown, and transmit power to the propeller shaft of the vehicle to drive the same.

An over-running clutch 12 has an outer rotatable member 13 held to the transmission housing 15 by pressure exerted by spring 19 on shoe 18 to friction lining 17. Member 13 rotates only when sufficient torque is applied.

Figure 1:
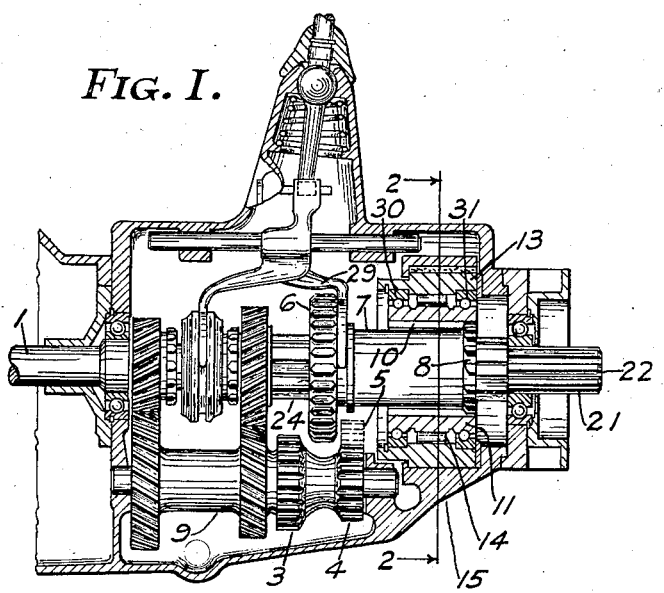
Fig. 1 is a vertical section of a conventional automobile transmission embodying the present invention.
Figure 3:
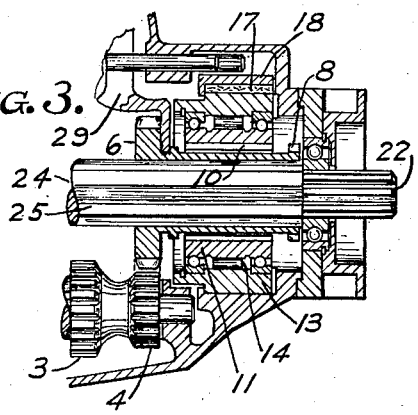
Fig. 3 is a vertical section of part of a conventional automobile transmission illustrating the reverse disconnected position of this invention.

The over-running clutch 12 has an inner cam member 11 and the conventional rollers 14, with which cooperate springs 20 and cam shoes 21. Internal clutch gear 10 occupies the entire length of 11. The external clutch gear 8, above mentioned, engages internal clutch gear 10 as shown in Fig. 1, and in Fig. 3 they are shown disconnected.

The over-running clutch 12 is centered by that part of the transmission housing 15 designated as 16, while the brake system exerts pressure on the outer member 13. The brake lining 17 may be of the type which is effective in oil and may be of metal integral with shoe 18. Shoe 18 has enough springing action allowing it to move in and take up wear of the lining. Stud 28 is threaded and screws on to the transmission housing and is adjustable by head 26 and locked by lock-nut 27, and provides adjustment for the above mentioned spring. This system keeps the braking pressure on outer member 13 very nearly constant as the lining 17 wears, and eliminates frequent manual adjustments which would otherwise be required. Ball bearings 30 and 31 are used to properly center cam member 11.

Figure 2:
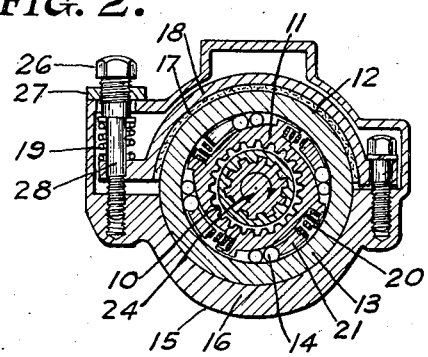
Fig. 2 is a vertical section taken upon line 2—2 of Fig. 1.

Member 13 rotates only when sufficient torque is applied in the direction opposite to that illustrated by the arrow in Fig. 2, to overcome the frictional resistance by which it is held. This takes place during reverse motion of the vehicle if the transmission is set for neutral or any forward speed. In this condition clutch members, 8 and 10 engage, and inner cam member 11 engages or grips outer member 13 due to the well known action of the rollers 14 caused by their wedging between the interior surface of 13 and the outer cam surface of 11. The vehicle is thus prevented from reversing under ordinary conditions as those caused by the vehicle's own weight. If the vehicle is hit with sufficient force tending to produce reverse motion the brake system will yield before any other part of the vehicle, and thus the novel method herein disclosed acts as a protective means.

Insofar as the braking effects on 13 are concerned, shaft 24 is free to rotate in the direction illustrated by the arrow in Fig. 2. This corresponds to the forward movement of the vehicle. In this direction, while member 7 rotates 11 through the engagement of clutch members 8 and 10, it will not be subjected to resistance, due to the well known freeing feature of the over-running clutch caused by rollers 14 moving slightly away from the wedging surfaces of members 11 and 13.

The transmission is adjusted to cause the vehicle to move in the reverse direction by the movement of lever 29, shifting member 7, and engaging reverse idler gear 5 to gear 6 and disconnecting clutch members 8 and 10. This is necessary since the above mentioned reverse braking action would otherwise interfere with the vehicle's normal movements.

Various changes may be made in details of construction by those skilled in the art without departing from the spirit or scope of the invention as defined by the appended claims.

I claim:

1. The combination, in a transmission, of an over-running clutch with an outer rotatable cylindrical member secured to the transmission housing by the close fitting interior of a second cylindrical member, means for applying pressure to the outer rotatable cylindrical member by closing a split section of the second cylindrical member, an inner cam member contained within the said outer rotatable member preventing reverse motion and having an internal clutch gear, a shiftable reverse torque transmitting member having an external clutch gear integral therewith and adapted to be engaged with the internal clutch gear of the inner cam member in all forward speeds and neutral.

2. The combination, in a transmission, of an over-running clutch with an outer rotatable member secured to the transmission housing under pressure and rotatable by forces exceeding a specified minimum and an inner cam member rotatable in the direction caused by forward motion, a reverse torque transmitting member internally splined and shiftable having a gear engageable for low and reverse speed and an external clutch gear integral therewith, and means on the inner cam member engageable to the external clutch gear of the said shiftable reverse torque transmitting member in all forward speeds and neutral.

3. The combination, in a transmission, of an over-running clutch with an outer rotatable member secured by friction to the transmission housing and an inner cam member rotatable in the direction caused by forward motion and offering great resistance to rotation caused by reverse motion, a reverse torque transmitting member internally splined and shiftable on the transmission shaft having a gear engageable for reverse speed and an external clutch gear integral therewith, and an internal clutch gear on the inner cam member engageable to the external clutch gear of the reverse torque transmitting member and the internal clutch gear having a width greater than the total movement of the said shiftable reverse transmitting member from neutral to low speed position and the width of the external clutch gear, and conveying reverse resistance thereto in these positions.

4. The combination, in a transmission, of means utilizing a brake shoe for providing permanent braking pressure, means for maintaining said braking pressure constant, an over-running clutch with its outer rotatable member held by the said braking pressure and an inner cam member rotatable in the direction caused by forward motion and having an internal clutch gear, a reverse torque transmitting member internally splined and shiftable on the transmission shaft and having an external clutch gear integral therewith and engageable to the said internal clutch gear in all forward speeds and neutral.

5. The combination, in a transmission, of a brake shoe providing braking action, a spring bearing on the said shoe to provide braking pressure and adjustable by a threaded stud, an over-running clutch with an outer rotatable member held by the said braking action and an inner member rotatable in the direction caused by forward motion and having an internal clutch gear integral therewith, and a reverse torque transmitting member internally splined and shiftable on the transmission shaft having an external clutch gear integral therewith and engageable to the said internal clutch gear in all forward speeds and neutral.

ARNOLD LESTI.